US012305659B2

(12) United States Patent
Ishii et al.

(10) Patent No.: US 12,305,659 B2
(45) Date of Patent: May 20, 2025

(54) BLOWER

(71) Applicant: DENSO CORPORATION, Kariya (JP)

(72) Inventors: Fumiya Ishii, Kariya (JP); Shouichi Imahigashi, Kariya (JP); Shuzo Oda, Kariya (JP)

(73) Assignee: DENSO CORPORATION, Kariya (JP)

( * ) Notice: Subject to any disclaimer, the term of this patent is extended or adjusted under 35 U.S.C. 154(b) by 84 days.

(21) Appl. No.: 18/295,316

(22) Filed: Apr. 4, 2023

(65) Prior Publication Data

US 2023/0243362 A1 Aug. 3, 2023

Related U.S. Application Data

(63) Continuation of application No. PCT/JP2021/035043, filed on Sep. 24, 2021.

(30) Foreign Application Priority Data

Oct. 7, 2020 (JP) ................................ 2020-169959

(51) Int. Cl.
*F04D 29/043* (2006.01)
*F04D 29/26* (2006.01)
*F04D 29/28* (2006.01)

(52) U.S. Cl.
CPC ......... *F04D 29/043* (2013.01); *F04D 29/263* (2013.01); *F04D 29/281* (2013.01); *F05D 2260/37* (2013.01)

(58) Field of Classification Search
CPC .... F04D 29/043; F04D 29/263; F04D 29/281; F04D 29/441; F04D 29/442; F04D 29/62; F05D 2260/37
See application file for complete search history.

(56) References Cited

U.S. PATENT DOCUMENTS 6,890,159 B2 * 5/2005 Motomura ............ F04D 29/263 417/424.2
2019/0203733 A1 * 7/2019 Rau ......................... F04D 25/06
2020/0166047 A1 * 5/2020 Chang ................... F04D 29/388

FOREIGN PATENT DOCUMENTS

DE 10039971 A1 * 5/2001 ........... F04D 29/263
JP 3997822 B2 10/2007
JP 2009264245 A 11/2009
JP 2020033889 A 3/2020
WO WO-2017154764 A1 * 9/2017 ........... F04D 29/023

* cited by examiner

*Primary Examiner* — Woody A Lee, Jr.
*Assistant Examiner* — Jesse M Prager
(74) *Attorney, Agent, or Firm* — Harness, Dickey & Pierce, P.L.C.

(57) ABSTRACT

A blower includes a drive device, a shaft, a fan and a rotation limiter member. The fan includes: a main plate that has an axial hole which is securely press-fitted to the shaft; a shroud that is opposed to the main plate and has a suction inlet, which is formed at a center part of the shroud; and a plurality of blades that are placed between the shroud and the main plate and are arranged one after another around a central axis of the fan. The rotation limiter member is fixed to the shaft and the main plate. The main plate includes: a slope portion that is placed on an outer side of the rotation limiter member; and at least one planar surface part which is perpendicular to the central axis and is formed around the central axis at a part of the slope portion.

6 Claims, 8 Drawing Sheets

BLOWER

CROSS REFERENCE TO RELATED APPLICATIONS

This application is a continuation application of International Patent Application No. PCT/JP2021/035043 filed on Sep. 24, 2021, which designated the U.S. and claims the benefit of priority from Japanese Patent Application No. 2020-169959 filed on Oct. 7, 2020. The entire disclosures of all of the above applications are incorporated herein by reference.

TECHNICAL FIELD

The present disclosure relates to a blower.

BACKGROUND

Previously, there has been proposed a blower that includes: a fan which is securely press-fitted to a shaft of an electric motor; and a cap which serves as a rotation limiter member that is securely press-fitted to an end portion of the shaft and the fan to limit relative rotation between the shaft and the fan.

The blower is constructed such that the fan and the cap are securely press-fitted to the shaft in a state where the fan and the cap are temporarily assembled together during an assembling process. Furthermore, in this blower, a press-fit load of the cap relative to the shaft is set to be larger than a press-fit load of the fan relative to the shaft. At this blower, at the time of securely press-fitting the fan and the cap to the shaft at the assembling process, a load is applied to an axial end surface of the cap, which is located at or adjacent to the central axis of the shaft, so that the fan may possibly be tilted relative to the shaft. When the amount of tilt of the fan relative to the shaft is increased, imbalance of the center of gravity is increased to cause an increase in the vibration at the time of rotating the fan.

SUMMARY

This section provides a general summary of the disclosure, and is not a comprehensive disclosure of its full scope or all of its features.

According to the present disclosure, there is provided a blower that includes a drive device, a shaft, a fan and a rotation limiter member. The shaft is configured to be rotated by a torque outputted from the drive device. The fan includes: a main plate that has an axial hole which is securely press-fitted to the shaft; a shroud that is opposed to the main plate and has a suction inlet, which is formed at a center part of the shroud and is configured to suction air; and a plurality of blades that are placed between the shroud and the main plate and are arranged one after another around a central axis of the fan. The rotation limiter member is fixed to the shaft and the main plate and is configured to limit relative rotation between the shaft and the fan. The main plate includes: a slope portion that is placed on an outer side of the rotation limiter member and is tilted such that a distance from the central axis to the slope portion in a radially outer direction is increased from one axial side, at which the axial hole is placed, toward the drive device; and at least one planar surface part, which is perpendicular to the central axis and is formed intermittently or continuously around the central axis at a part of the slope portion.

BRIEF DESCRIPTION OF DRAWINGS

The drawings described herein are for illustrative purposes only of selected embodiments and not all possible implementations, and are not intended to limit the scope of the present disclosure.

DETAILED DESCRIPTION

Figure 1:
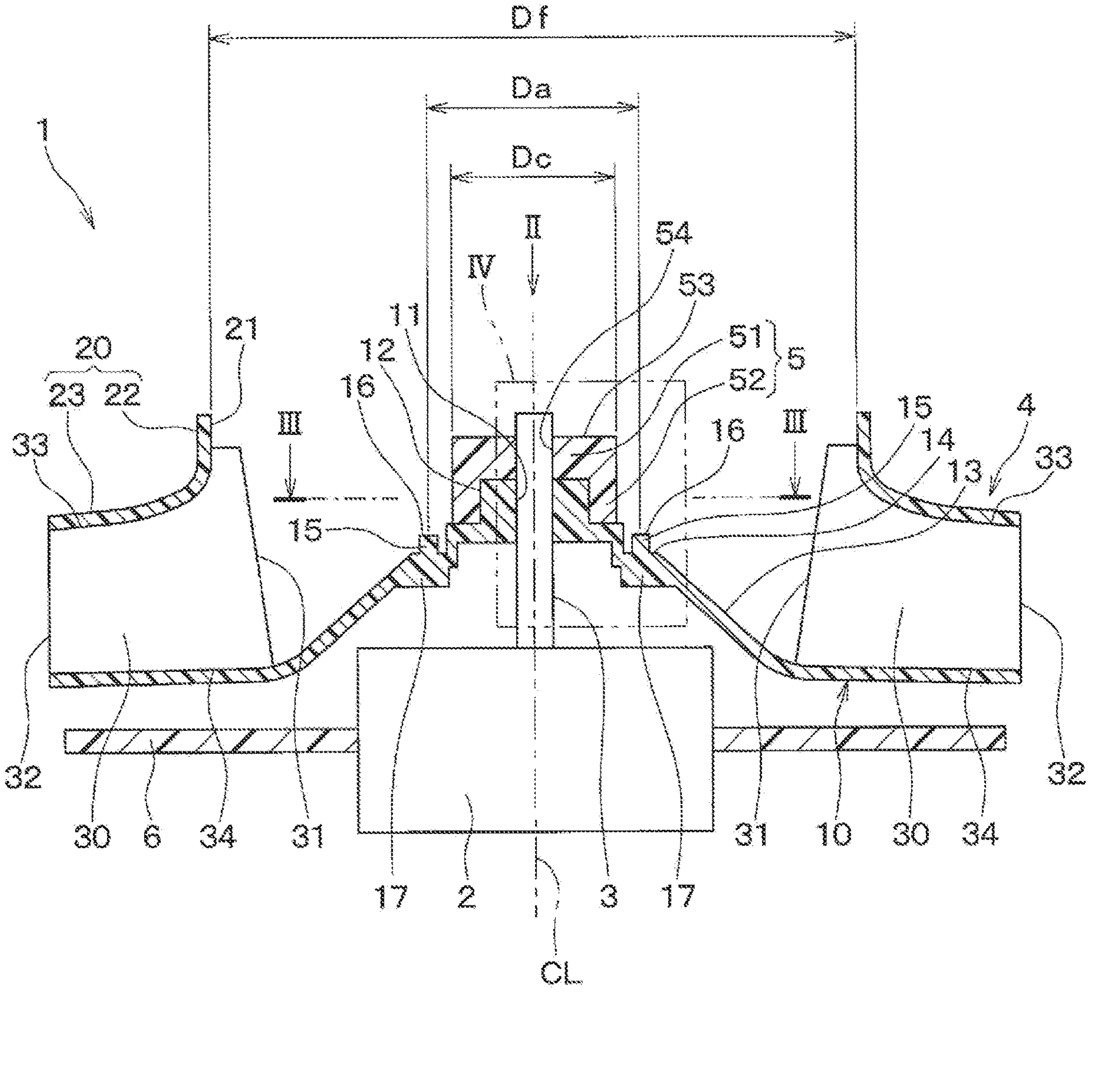
FIG. 1 is a cross-sectional view of a blower of a first embodiment taken along an imaginary plane which includes a central axis of the blower.

Previously, there has been proposed a blower that includes: a fan which is securely press-fitted to a shaft of an electric motor; and a cap which serves as a rotation limiter member that is securely press-fitted to an end portion of the shaft and the fan to limit relative rotation between the shaft and the fan.

The blower is constructed such that the fan and the cap are securely press-fitted to the shaft in a state where the fan and the cap are temporarily assembled together during an assembling process. Furthermore, in this blower, a press-fit load of the cap relative to the shaft is set to be larger than a press-fit load of the fan relative to the shaft. At this blower, at the time of securely press-fitting the fan and the cap to the shaft at the assembling process, a load is applied to an axial end surface of the cap, which is located at or adjacent to the central axis of the shaft, so that the fan may possibly be tilted relative to the shaft. When the amount of tilt of the fan relative to the shaft is increased, imbalance of the center of gravity is increased to cause an increase in the vibration at the time of rotating the fan.

According to one aspect of the present disclosure, a blower includes a drive device, a shaft, a fan and a rotation limiter member. The shaft is configured to be rotated by a torque outputted from the drive device. The fan includes: a main plate that has an axial hole which is securely press-fitted to the shaft; a shroud that is opposed to the main plate and has a suction inlet, which is formed at a center part of the shroud and is configured to suction air; and a plurality of blades that are placed between the shroud and the main plate and are arranged one after another around a central axis of the fan. The rotation limiter member is fixed to the shaft and the main plate and is configured to limit relative rotation between the shaft and the fan. The main plate of the fan includes: a slope portion that is placed on an outer side of the rotation limiter member and is tilted such that a distance from the central axis to the slope portion in a radially outer direction is increased from one axial side, at which the axial hole is placed, toward the drive device; and at least one planar surface part which is perpendicular to the central axis and is formed intermittently or continuously around the central axis at a part of the slope portion.

With this configuration, at this blower, at the time of securely press-fitting the axial hole of the fan to the shaft during the assembling process, the load can be applied from, for example, a pressing jig to the at least one planar surface part. Since the at least one planar surface part is the surface which is perpendicular to the central axis of the fan (i.e., the center of axial hole of the fan), the load is applied from the pressing jig in parallel with the central axis of the fan and the shaft to the at last one planar surface part. Furthermore, since the at least one planar surface part is located on the radially outer side of the rotation limiter member, it is possible to limit the tilting of the fan at the time of press-fitting the fan in comparison to the case where the load is applied only to the rotation limiter member. Specifically, in a case where a tolerance of perpendicularity of the rotation limiter member relative to the central axis is the same as a tolerance of perpendicularity of the at least one planar surface part relative to the central axis, it is possible to further limit the tilting of the fan at the time of press-fitting the fan by also applying the load to the at least one planar surface part in comparison to the case where the load is applied only to the rotation limiter member. Therefore, this blower can limit the imbalance of the center of gravity during the assembling process to reduce the vibration at the time of rotating the fan.

Hereinafter, embodiments of the present disclosure will be described with reference to the drawings. In each of the following embodiments, portions, which are the same or equivalent to each other, will be indicated by the same reference signs. In addition, a shape of each portion of a blower shown in the respective drawings will be described schematically for the sake of clarity, and this disclosure is not intended to be limited by it.

First Embodiment

A first embodiment of the present disclosure will be described with reference to the drawings. The blower of the present embodiment is a centrifugal blower that is used in, for example, an air conditioning apparatus or a ventilating apparatus.

Figure 2:
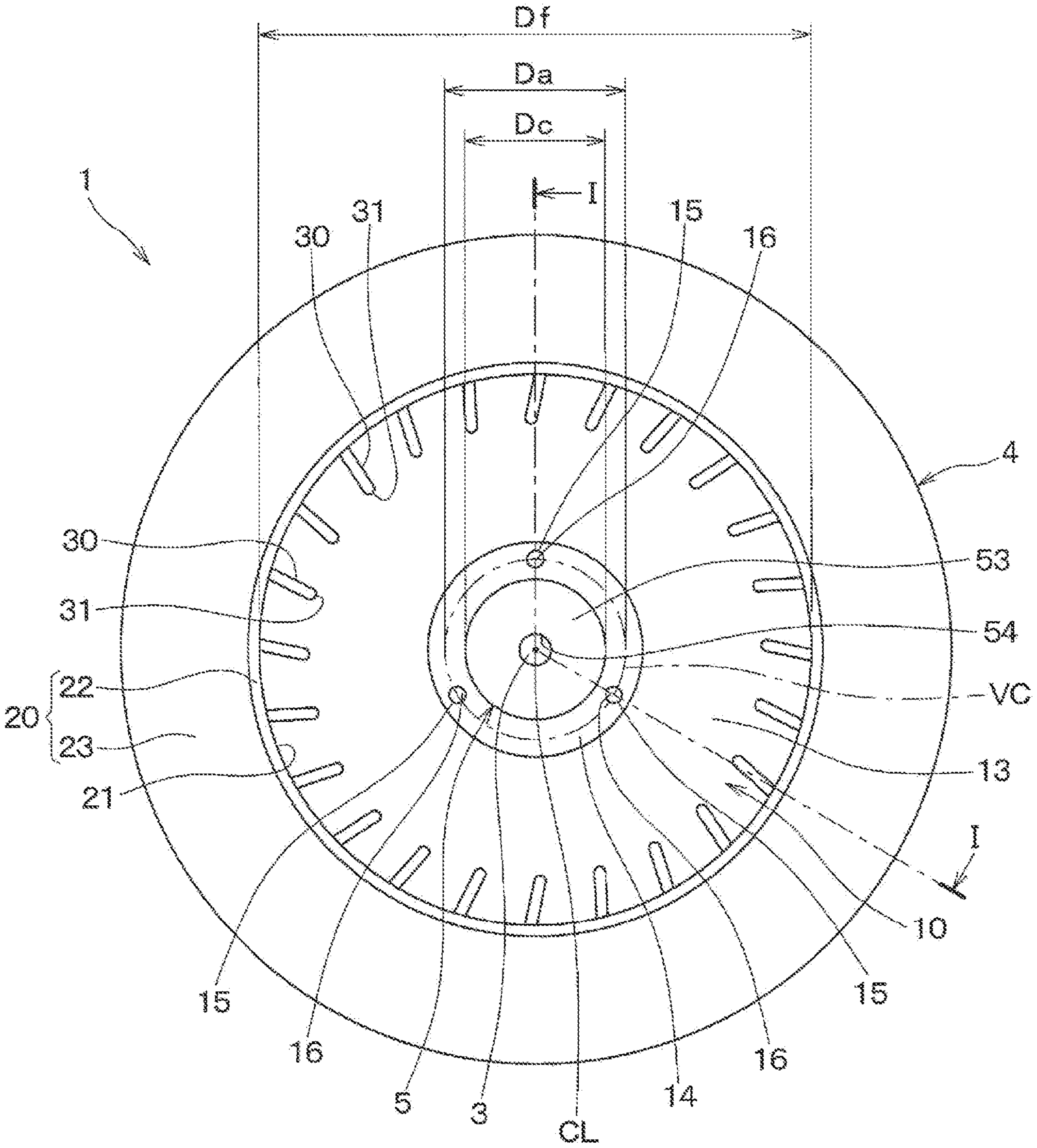
FIG. 2 is a plan view seen in a direction of an arrow II in FIG. 1.

As shown in FIGS. 1 and 2, the blower 1 includes a drive device 2, a shaft 3, a fan 4 and a rotation limiter member 5.

The drive device 2 includes an electric motor that outputs a torque upon energization of the electric motor. The drive device 2 is fixed to a housing 6 of, for example, the air conditioning apparatus. The shaft 3, which projects from the electric motor of the drive device 2, is rotated about a central axis of the shaft 3 by the torque outputted from the electric motor.

The fan 4 is a centrifugal fan and includes: a main plate 10, which is shaped in a form of a substantially circular disk; a shroud 20, which is opposed to the main plate 10; and a plurality of blades 30, which are placed between the shroud 20 and the main plate 10 and are arranged one after another around the central axis CL of the fan 4. The central axis CL of the fan 4 refers to a center of an axial hole 11 formed at the main plate 10 of the fan 4. The central axis CL of the fan 4 and the central axis of the shaft 3 coincide with each other.

The shroud 20 includes a tubular portion 22 and a ring portion 23. The tubular portion 22 forms a suction inlet 21 which is configured to suction air. The ring portion 23 extends radially outward from a part of the tubular portion 22, which is located on the drive device 2 side, such that the ring portion 23 extends along the main plate 10 and progressively approaches the main plate 10 as the ring portion 23 extends radially outward.

The blades 30 are placed between the main plate 10 and the shroud 20. The blades 30 are arranged at predetermined intervals in a rotational direction of the fan 4. A leading edge 31 of each blade 30 is located on a radially inner side of a diameter Df of the suction inlet 21 of the shroud 20. One of two opposite sides of each blade 30, which are directed opposite to each other in the axial direction of the central axis CL, is joined to the shroud 20, and the other one of the two opposite sides of the blade 30 is joined to the main plate 10. Specifically, the fan 4 of the present embodiment is a closed fan, in which the main plate 10, the shroud 20 and the blades 30 are formed integrally in one-piece. The fan 4 is formed integrally in one-piece by, for example, resin injection molding.

The main plate 10 is shaped in a form of a substantially circular disk. The main plate 10 has the axial hole 11 at a center part of the main plate 10. The shaft 3 is securely press-fitted into the axial hole 11 of the main plate 10. A plurality of fitting recesses 12, into which a plurality of legs 52 of the rotation limiter member 5 described later are respectively fitted, are formed around the axial hole 11 of the main plate 10.

Figure 3:
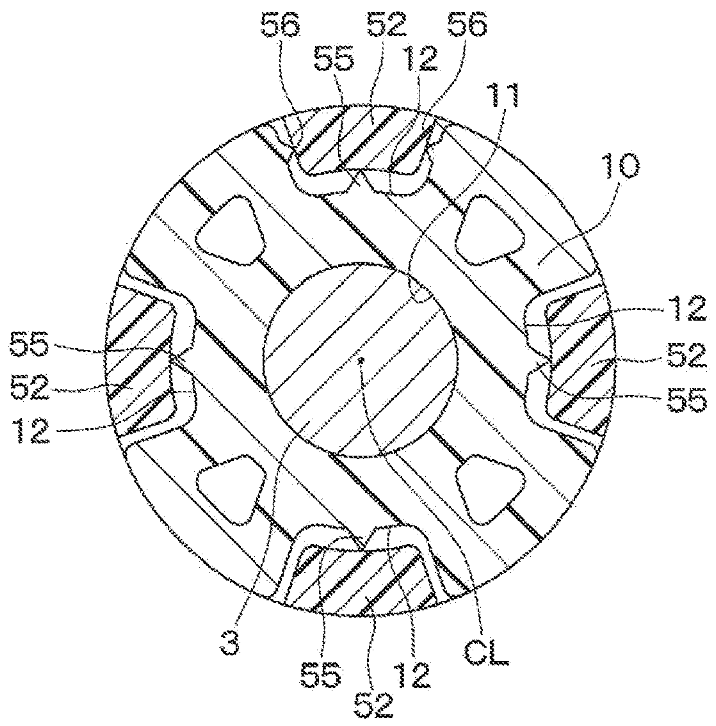
FIG. 3 is a cross-sectional view taken along line III-III in FIG. 1.

As shown in FIGS. 1 to 3, the rotation limiter member 5 is fixed to the shaft 3 and the main plate 10 and is configured to limit relative rotation between the shaft 3 and the fan 4. The rotation limiter member 5 is also referred to as a fan cap. The rotation limiter member 5 includes: a boss 51, which is shaped in a cylindrical tubular form; and the legs 52 which extend from the boss 51 toward the drive device 2. A surface 53 of the boss 51, which faces the suction inlet 21, is formed as a planar surface that is perpendicular to the central axis CL. A center part of the boss 51 has a center hole 54 which is securely press-fitted to the shaft 3. A press-fit load between the center hole 54 of the boss 51 and the shaft 3 is set to be larger than a press-fit load between the axial hole 11 of the main plate 10 and the shaft 3. Therefore, a holding force for limiting the relative rotation between the rotation limiter member 5 and the shaft 3 is set to be larger than a holding force for limiting the relative rotation between the fan 4 and the shaft 3.

The legs 52 of the rotation limiter member 5 are respectively fitted into the fitting recesses 12 of the main plate 10. Each fitting recess 12 has a primary projection 55 and two secondary projections 56. The primary projection 55 projects radially outward from a surface of an inner wall of the fitting recess 12, which faces radially outward, and the secondary projections 56 circumferentially project from two surfaces, respectively, of the inner wall of the fitting recess 12, which face each other in the circumferential direction. Therefore, without setting severe dimensional accuracy at a manufacturing process of the blower 1, the rotation limiter member 5 and the fan 4 can be temporarily assembled together by closely contacting the legs 52 of the rotation limiter member 5 to the fitting recesses 12, respectively, in a state where distal ends of the primary projections 55 and the secondary projections 56 are deformed. Thus, during an assembling process of the blower 1, the shaft 3 can be securely press-fitted to the rotation limiter member 5 and the fan 4 in the state where the rotation limiter member 5 and the fan 4 are temporarily assembled together.

When the electric motor, which serves as the drive device 2, is energized, the shaft 3 is rotated by the torque, which is outputted from the drive device 2. The rotation of the shaft 3 is transmitted from the rotation limiter member 5 to the fan 4, so that the rotation limiter member 5 and the fan 4 are rotated together with the shaft 3. When the fan 4 is rotated, the air, which is suctioned from the suction inlet 21, flows from the leading edges 31 of the corresponding adjacent blades 30 through a corresponding passage formed between the corresponding adjacent blades 30 and is radially outwardly discharged from a corresponding air outlet formed by the shroud 20, a radially outer end part of the main plate 10 and trailing edges 32 of the corresponding adjacent blades 30.

Figure 4:
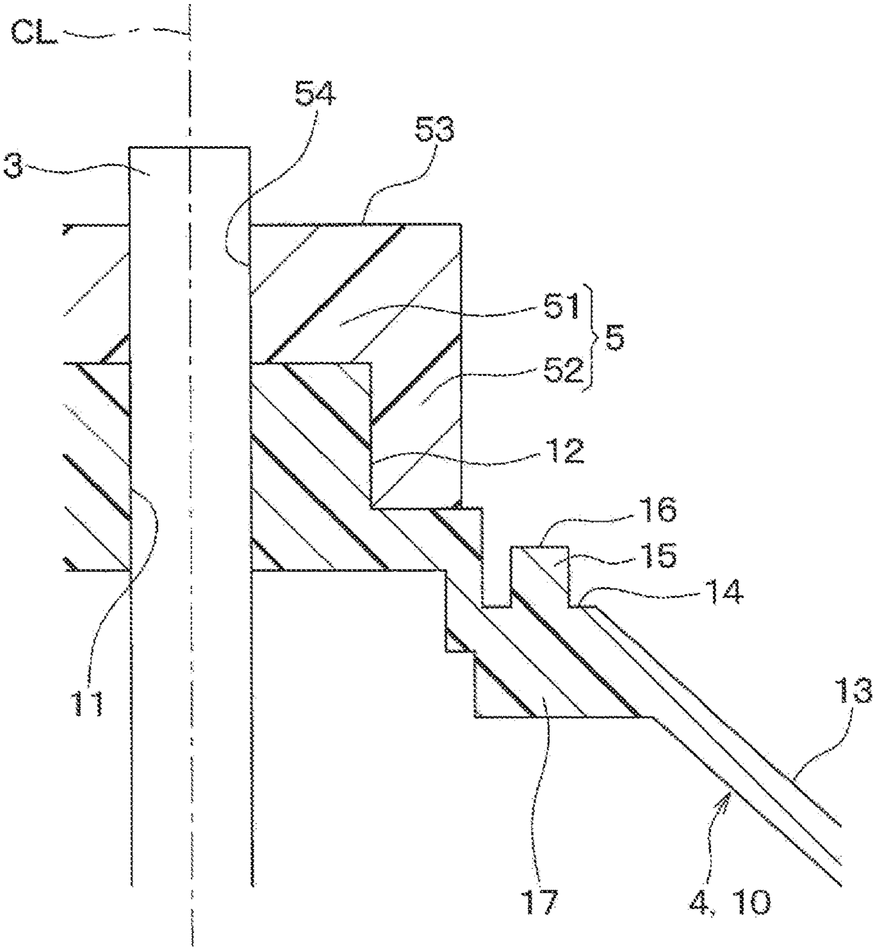
FIG. 4 is a partial enlarged view of a portion IV in FIG. 1.

As shown in FIGS. 1, 2 and 4, in the blower 1 of the present embodiment, the main plate 10 of the fan 4 includes a slope portion 13, a step 14, a plurality of projections 15, a plurality of planar surface parts 16 and a plurality of ribs 17 in addition to the axial hole 11 and the fitting recesses 12. These portions of the main plate 10 are integrally molded together in one-piece from the resin at the time of injection molding of the fan 4.

The slope portion 13 is placed on an outer side of the rotation limiter member 5 and is tilted such that a distance from the central axis CL to the slope portion 13 in a radially outer direction is increased from one axial side, at which the axial hole 11 is placed, toward the drive device 2. In other words, the slope portion 13 is tilted from a joint point, at which the leading edge 31 of each blade 30 is joined to the main plate 10, toward the radially inner side such that the slope portion 13 is convex toward the suction inlet 21. The slope portion 13 guides the air, which is suctioned from the suction inlet 21, toward each passage formed between the corresponding adjacent two of the blades 30.

The step 14 is formed at a part of the slope portion 13. A surface of the step 14 extends perpendicular to the central axis CL. Furthermore, the step 14 is shaped in a form of a ring which circumferentially extends around the central axis CL. In the present embodiment, the step 14 is located closer to the rotation limiter member 5 than the leading edge 31 of each blade 30.

The projections 15 are formed at the part of the slope portion 13. Specifically, in the present embodiment, the three projections 15 are arranged intermittently one after another around the central axis CL at predetermined intervals at the step 14 formed at the part of the slope portion 13. Although the number of the projections 15 is set to be three in the present embodiment, the number of the projections 15 can be set arbitrarily as long as the number of the projections 15 is three or more.

Each of the projections 15 extends in parallel with the central axis CL from the step 14 toward the suction inlet 21. A surface of each projection 15, which faces toward the suction inlet 21, is formed as a planar surface that is perpendicular to the central axis CL. In the present embodiment, the surface of each projection 15, which faces toward the suction inlet 21, forms the planar surface part 16. Specifically, the planar surface parts 16, which are respectively formed by the surfaces of the projections 15 that face toward the suction inlet 21, are perpendicular to the central axis CL and are formed intermittently around the central axis CL at the part of the slope portion 13. Furthermore, a height of each of the planar surface parts 16 measured in the axial direction of the central axis CL is identically set. In other words, the planar surface parts 16 are located along a common imaginary plane which is perpendicular to the central axis CL.

The ribs 17 are formed at an opposite side of the main plate 10, which is opposite to the projections 15, such that each of the ribs 17 is placed at a location that is on an axial side of a corresponding one of the projections 15 which is opposite to the suction inlet 21. The ribs 17 are provided to increase the rigidity of the main plate 10 at and around the locations where the projections 15 are formed. Specifically, in a case where a load is applied in parallel with the central axis CL to the planar surface parts 16 of the projections 15, which face toward the suction inlet 21, toward the drive device 2, the ribs 17 limit deformation of the portions of the main plate 10, at or around which the projections 15 are formed.

Here, with reference to FIGS. 1 and 2, Da denotes a diameter of an imaginary circle VC, which is centered on the central axis CL and circumferentially extends through radial centers of the planar surface parts 16 of the projections 15 which face toward the suction inlet 21. Dc denotes an outer diameter of the rotation limiter member 5. Furthermore, Df denotes a diameter of the suction inlet 21 of the shroud 20. Under the above-described circumstance, there is satisfied a relationship of $Dc<Da<Df$. Hereinafter, the significance of this setting will be explained.

The blower 1 of the present embodiment is configured such that in the assembling process of the blower 1, the shaft 3 can be securely press-fitted to the rotation limiter member 5 and the fan 4 in the state where the rotation limiter member 5 and the fan 4 are temporarily assembled together. At this time, a load is applied to the surface 53 of the rotation limiter member 5, which faces toward the suction inlet 21, by a pressing jig (not shown), and also a load is applied to the planar surface parts 16 of the projections 15, which face toward the suction inlet 21, by the pressing jig. At this time, as described above, in the present embodiment, the diameter Da of the imaginary circle VC, which circumferentially extends through the radial centers of the planar surface parts 16, and the outer diameter Dc of the rotation limiter member 5 satisfy the relationship of $Da>Dc$. That is, the planar surface parts 16 are located on the outer side of the rotation limiter member 5. Therefore, in comparison to a case where the load is applied only to the rotation limiter member 5, it is possible to limit tilting of the fan 4 at the time of press-fitting the fan 4 by also applying the load to the planar surface parts 16.

Specifically, it is assumed that the tolerance of the perpendicularity of the surface 53 of the rotation limiter member 5 relative to the central axis CL is the same as the tolerance of the perpendicularity of the planar surface parts 16 relative to the central axis CL. In this case, in comparison to a tilt angle of the surface 53 of the rotation limiter member 5 relative to the central axis CL caused by the tolerance, a tilt angle of the imaginary circle VC, which circumferentially extends through the radial centers of the planar surface parts 16, relative to the central axis CL becomes small. Therefore, in comparison to the case where the load is applied only to the rotation limiter member 5, it is possible to limit the tilting of the fan 4 at the time of press-fitting the fan 4 by also applying the load to the planar surface parts 16.

As described above, the ribs 17 are formed at the opposite side of the main plate 10, which is opposite to the projections 15, such that each of the ribs 17 is placed at the location that is on the axial side of the corresponding one of the projections 15 which is opposite to the suction inlet 21. Therefore, during the assembling process, at the time of applying the load in parallel with the central axis CL from the pressing jig to the planar surface parts 16 of the projections 15, which face toward the suction inlet 21, it is possible to limit the deformation of the portions of the main plate 10, at or around which the projections 15 are formed, toward the drive device 2 side. Since the pressing jig applies the load in parallel with the central axis CL to the planar surface parts 16, it is possible to limit the tilting of the fan 4 at the time of press-fitting the fan 4.

Here, in a case where the planar surface parts 16 are located on the radially outer side of the diameter Df of the suction inlet 21 of the shroud 20, when the load is applied to the planar surface parts 16 at the time of press-fitting the fan 4, the planar surface parts 16 and its surroundings may possibly be flexed toward the drive device 2 side. In such a case, it becomes difficult to apply the load in parallel with the central axis CL to the planar surface parts 16 from the pressing jig, and there is a risk that the fan 4 is tilted and is press-fitted to the shaft 3.

In contrast, in the present embodiment, the diameter Da of the imaginary circle VC, which circumferentially extends through the radial centers of the planar surface parts 16, and the diameter Df of the suction inlet 21 of the shroud 20 satisfy the relationship Da<Df. That is, the planar surface parts 16 are located on the inner side of the diameter Df of the suction inlet 21 of the shroud 20. Thus, even when the load is applied to the planar surface parts 16 at the time of press-fitting the fan 4, the flexing of the planar surface parts 16 and its surroundings can be limited. Since the pressing jig can apply the load in parallel with the central axis CL to the planar surface parts 16, it is possible to limit the tilting of the fan 4 at the time of press-fitting the fan 4.

Figure 5:
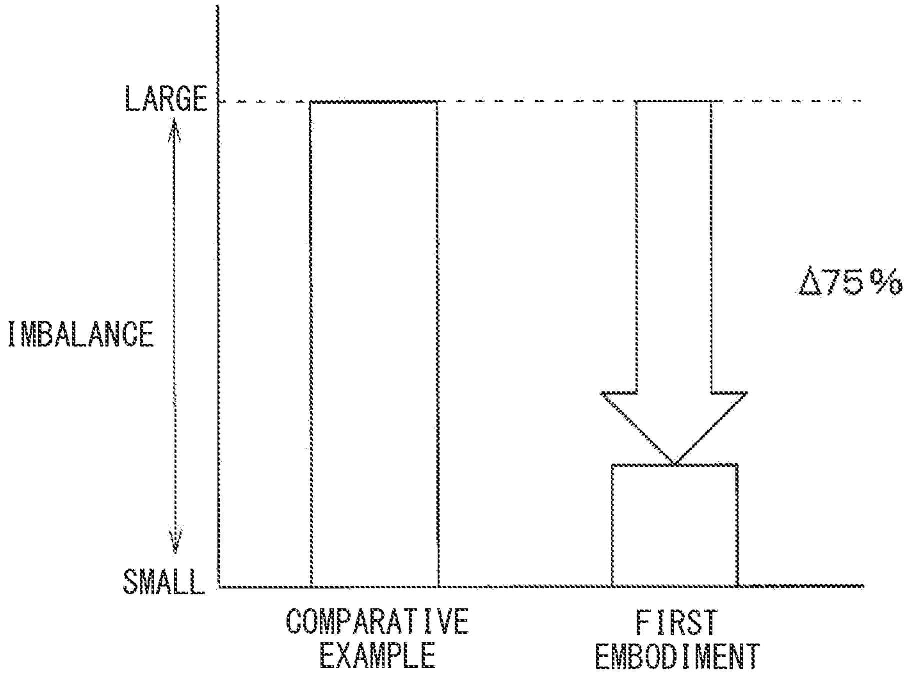
FIG. 5 is a graph showing a result of an experiment for measuring a degree of imbalance for each of the blower of the first embodiment and a blower of a comparative example.

Here, FIG. 5 shows a result of an experiment for measuring a degree of imbalance for each of the blower 1 of the first embodiment and the blower of the comparative example. The degree of imbalance is the amount of deviation of the center of gravity of the fan 4 at the time of rotating the blower 1.

The blower of the comparative example used in the experiment is assembled such that in the assembling process, the load is applied from the pressing jig only to the surface 53 of the rotation limiter member 5, which faces toward the suction inlet 21, to securely press-fit the rotation limiter member 5 and the fan 4 to the shaft 3. The blower of the comparative example and the blower 1 of the first embodiment have substantially the same configuration.

The degree of imbalance is measured by installing each of the blower of the comparative example and the blower 1 of the first embodiment on an imbalance measurement device (not shown), and the electric motor of the drive device 2 is rotated at the same rotational speed. As a result, it is found that the blower 1 of the first embodiment reduced the degree of imbalance by 75% compared to the blower of the comparative example. According to this result, it can be said that the blower 1 of the first embodiment has lower vibration compared with the blower of the comparative example.

The blower 1 of the first embodiment described above implements the following actions and effects.

(1) In the first embodiment, the main plate 10 of the fan 4 of the blower 1 includes: the slope portion 13 that is placed on the outer side of the rotation limiter member 5 and is tilted such that the distance from the central axis CL to the slope portion 13 in the radially outer direction is increased from the one axial side, at which the axial hole 11 is placed, toward the drive device 2; and the planar surface parts 16, which are formed intermittently around the central axis CL at the part of the slope portion 13. Each of the planar surface parts 16 is the surface that is perpendicular to the central axis CL.

With this configuration, at this blower 1, at the time of securely press-fitting the axial hole 11 of the fan 4 to the shaft 3 during the assembling process, the load can be applied from, for example, the pressing jig to the planar surface parts 16. Since each of the planar surface parts 16 is the surface, which is perpendicular to the central axis CL, the load is applied from the pressing jig in parallel with the central axis CL of the fan 4 and the shaft 3 to the planar surface parts 16. Furthermore, since the planar surface parts 16 are located on the radially outer side of the rotation limiter member 5, it is possible to limit the tilting of the fan 4 at the time of press-fitting the fan 4 in comparison to the case where the load is applied only to the rotation limiter member 5. Therefore, this blower 1 can limit the imbalance of the center of gravity during the assembling process to reduce the vibration at the time of rotating the fan 4.

(2) In the first embodiment, the main plate 10 of the fan 4 has the at least three projections 15 that are arranged one after another around the central axis CL at the part of the slope portion 13. Each of the planar surface parts 16 is formed as the surface of the corresponding one of the at least three projections 15 while the surface of the corresponding one of the at least three projections 15 faces toward the suction inlet 21.

With this configuration, by forming the surface of each projection 15 located at the part of the slope portion 13 as the planar surface part 16, the planar surface part 16 can be easily formed. Specifically, for example, in a molding die, which is used at the time of injection molding of the fan 4, by machining and modifying each portion of this molding die, which forms the corresponding axial end surface of the projection 15 (i.e., the planar surface part 16), the accuracy of the perpendicularity and the flatness of this planar surface part 16 relative to the central axis CL can be improved. That is, it is possible to relatively easily form the planar surface parts 16 on the common virtual plane which is perpendicular to the central axis CL.

(3) In the first embodiment, the main plate 10 of the fan 4 has the step 14 which is formed at the part of the slope portion 13 and has the surface that is perpendicular the central axis CL. The projections 15 are formed at the step 14.

With this configuration, during the assembling process, at the time of applying the load from the pressing jig to the planar surface parts 16 respectively formed at the projections 15, even when the projections 15 and its surroundings are slightly flexed toward the drive device 2 side, interference between the slope portion 13 of the fan 4 and the pressing jig can be limited. Therefore, the pressing jig can apply the load in parallel with the central axis CL to the planar surface parts 16 respectively formed at the projections 15, and thereby it is possible to limit the tilting of the fan 4 at the time of press-fitting the fan 4.

(4) In the first embodiment, the step 14 of the main plate 10 of the fan 4 is in the form of the ring which circumferentially extends around the central axis CL.

Therefore, the step 14 can be formed relatively easily by simplifying the configuration of the molding die used for the injection molding of the fan 4. Furthermore, in comparison to a configuration, in which the step 14 is formed intermittently around the central axis CL, it is possible to reduce air resistance at the time of rotating the fan 4 by forming the step 14 in the form of the ring which circumferentially and continuously extends around the central axis CL.

(5) In the first embodiment, the main plate 10 of the fan 4 has the ribs 17, each of which is placed at the location that is on the axial side of the corresponding one of the projections 15 which is opposite to the suction inlet 21.

With this configuration, during the assembling process, at the time of applying the load from the pressing jig to the planar surface parts 16 respectively formed at the projections 15, the ribs 17 can limit the deformation of the projections 15 and its surroundings toward the drive device 2 side. Therefore, the pressing jig can apply the load in parallel with the central axis CL to the planar surface parts 16 respectively formed at the projections 15, and thereby it is possible to limit the tilting of the fan 4 at the time of press-fitting the fan 4.

(6) In the first embodiment, the diameter Da of the imaginary circle VC, which circumferentially extends through the radial centers of the planar surface parts 16, and the outer diameter Dc of the rotation limiter member 5 satisfy the relationship of Da>Dc.

Therefore, in comparison to the case where the load is applied only to the rotation limiter member 5, it is possible to limit the tilting of the fan 4 at the time of press-fitting the fan 4 by also applying the load to the planar surface parts 16. Specifically, it is assumed that a tolerance of the perpendicularity of the surface 53 of the rotation limiter member 5 relative to the central axis CL is the same as a tolerance of the perpendicularity of the planar surface parts 16 relative to the central axis CL. In this case, in comparison to a tilt angle of the surface 53 of the rotation limiter member 5 relative to the central axis CL caused by the tolerance, a tilt angle of the imaginary circle VC, which circumferentially extends through the radial centers of the planar surface parts 16, relative to the central axis CL becomes small. Therefore, in comparison to the case where the load is applied only to the rotation limiter member 5, it is possible to limit the tilting of the fan 4 at the time of press-fitting the fan 4 by also applying the load to the planar surface parts 16.

(7) In the first embodiment, the diameter Da of the imaginary circle VC, which circumferentially extends through the radial centers of the planar surface parts 16, and the diameter Df of the suction inlet 21 of the shroud 20 satisfy the relationship Da<Df.

Thus, even when the press-fitting load is applied to the planar surface parts 16 at the time of press-fitting the fan 4, the flexing of the planar surface parts 16 and its surroundings can be limited. Since the pressing jig can apply the load in parallel with the central axis CL to the planar surface parts 16, it is possible to limit the tilting of the fan 4 at the time of press-fitting the fan 4.

Second Embodiment

Next, a second embodiment will be described. The second embodiment is a modification of a portion of the structure of the fan 4 in comparison to the first embodiment, and the rest of the second embodiment is the same as that of the first embodiment. Therefore, only the parts different from those of the first embodiment will be described in the following description.

Figure 6:
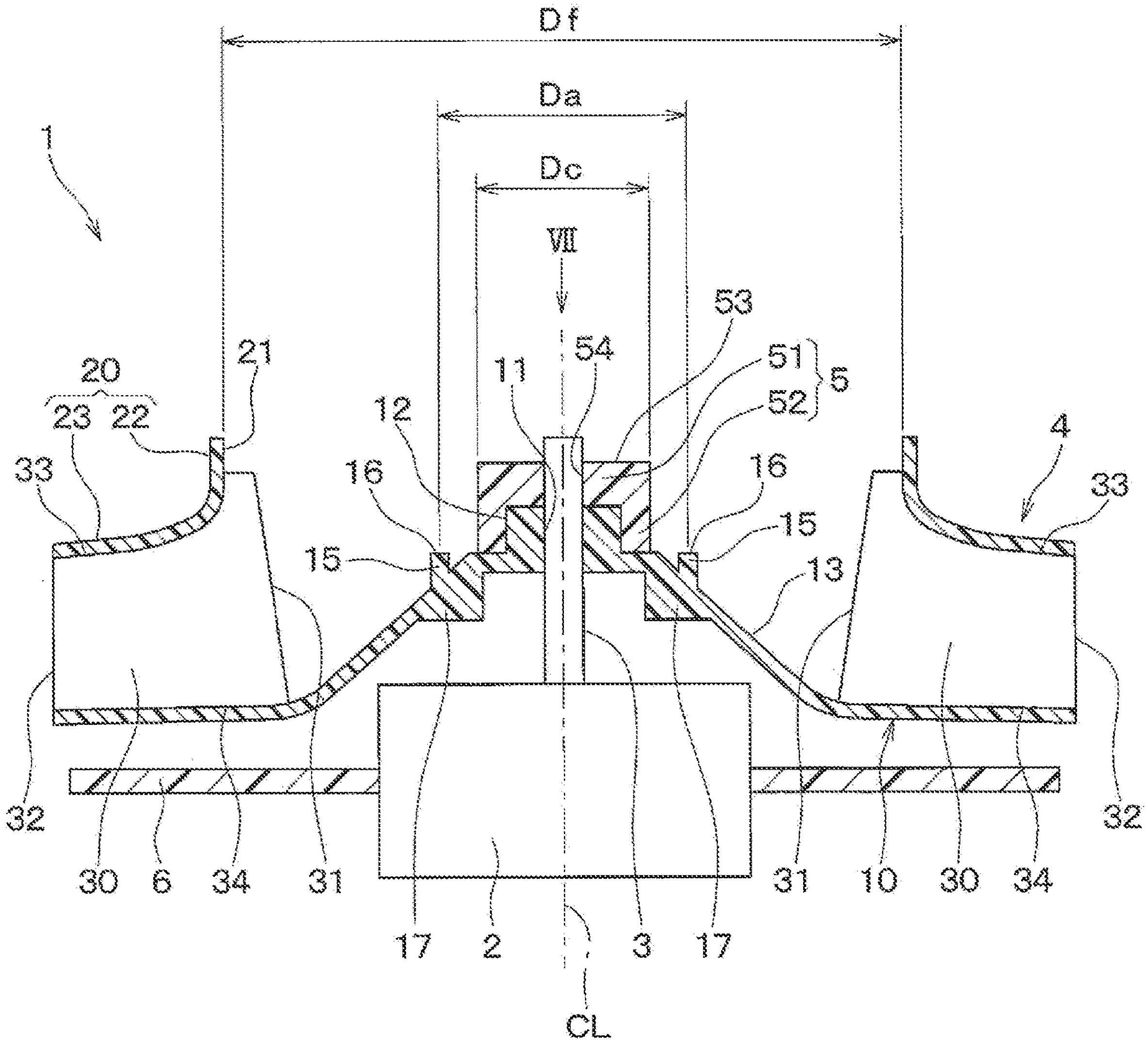
FIG. 6 is a cross-sectional view of a blower of a second embodiment taken along an imaginary plane which includes a central axis of the blower.
Figure 7:
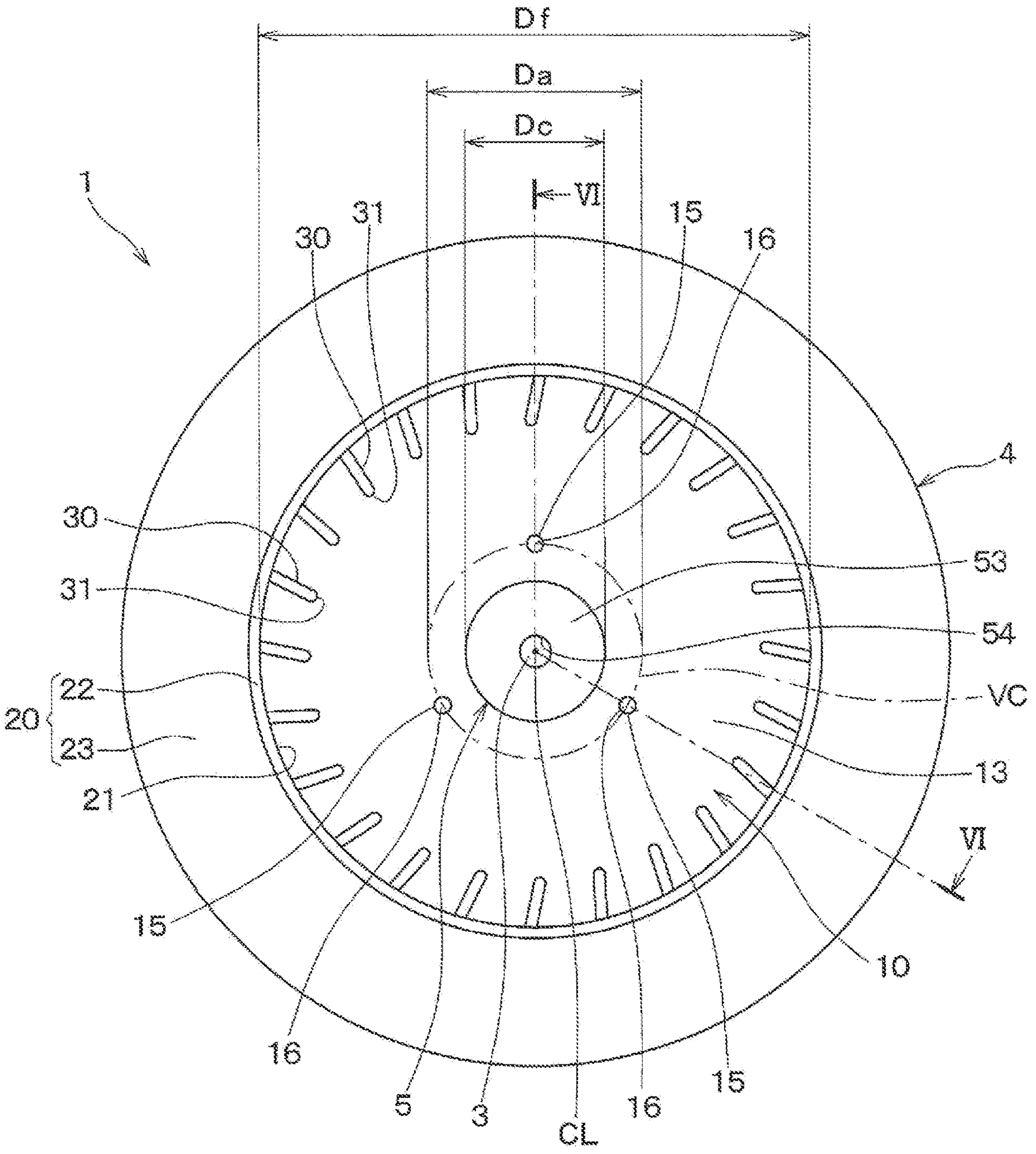
FIG. 7 is a plan view seen in a direction of an arrow VII in FIG. 6.

As shown in FIGS. 6 and 7, in the second embodiment, the step is not formed at the main plate 10 of the fan 4. Therefore, the projections 15 are directly formed at the part of the slope portion 13 of the main plate 10 of the fan 4. Even in the second embodiment, although the number of the projections 15 is set to be three, the number of the projections 15 can be set arbitrarily as long as the number of the projections 15 is three or more. The three projections 15 are arranged one after another at predetermined intervals around the central axis CL.

Each of the projections 15 extends in parallel with the central axis CL from the slope portion 13 toward the suction inlet 21. The surface of each projection 15, which faces toward the suction inlet 21, is formed as the planar surface that is perpendicular to the central axis CL. Even in the second embodiment, the surface of each projection 15, which faces toward the suction inlet 21, forms the planar surface part 16. The planar surface parts 16, which are respectively formed by the surfaces of the projections 15 that face toward the suction inlet 21, are perpendicular to the central axis CL and are formed intermittently around the central axis CL at the part of the slope portion 13. Furthermore, a height of each of the planar surface parts 16 measured in the axial direction of the central axis CL is identically set. In other words, the planar surface parts 16 are located along a common imaginary plane which is perpendicular to the central axis CL.

The ribs 17 are formed at an opposite side of the main plate 10, which is opposite to the projections 15, such that each of the ribs 17 is placed at a location that is on an axial side of a corresponding one of the projections 15 which is opposite to the suction inlet 21. The ribs 17 are provided to increase the rigidity of the main plate 10 at and around the locations where the projections 15 are formed. Specifically, during the assembling process, at the time of applying the load from the pressing jig to the planar surface parts 16 respectively formed at the projections 15, the ribs 17 can limit the deformation of the projections 15 and its surroundings toward the drive device 2 side.

Even in the second embodiment, the diameter Da of the imaginary circle VC, which circumferentially extends through the radial centers of the planar surface parts 16, and the outer diameter Dc of the rotation limiter member 5 satisfy the relationship Dc<Da. Therefore, in comparison to the case where the load is applied only to the rotation limiter member 5, it is possible to limit the tilting of the fan 4 at the time of press-fitting the fan 4 by also applying the load to the planar surface parts 16. Furthermore, the diameter Da of the imaginary circle VC, which circumferentially extends through the radial centers of the planar surface parts 16, and the diameter Df of the suction inlet 21 of the shroud 20 satisfy the relationship Da<Df. Thus, even when the load is applied to the planar surface parts 16 at the time of press-fitting the fan 4, the flexing of the planar surface parts 16 and its surroundings can be limited.

The blower 1 of the second embodiment described above can achieve the same actions and effects as those of the first embodiment.

In the second embodiment, during the assembling process, at the time of applying the load from the pressing jig to the projections 15, when the projections 15 and its surroundings are concavely deformed toward the drive device 2 side, interference between a part of the slope portion 13 of the main plate 10, which is located on the radially inner side of the projections 15, and the pressing jig may possibly occur. However, in such a case, by increasing the axial height of the respective projections 15 or increasing the rigidity of the respective ribs 17, there will be no such a disadvantage since the interference between the part of the slope portion 13 of the main plate 10, which is located on the radially inner side of the projections 15, and the pressing jig is limited. Therefore, even with the configuration of the second embodiment, the pressing jig can apply the load in parallel with the central axis CL to the planar surface parts 16 respectively formed at the projections 15, and thereby it is possible to limit the tilting of the fan 4 at the time of press-fitting the fan 4.

Third Embodiment

Next, a third embodiment will be described. The third embodiment is a modification of a portion of the structure of the fan 4 in comparison to the first embodiment and the second embodiment, and the rest of the third embodiment is the same as that of the first and second embodiments. Therefore, only the parts different from those of the first and second embodiments will be described in the following description.

Figure 8:
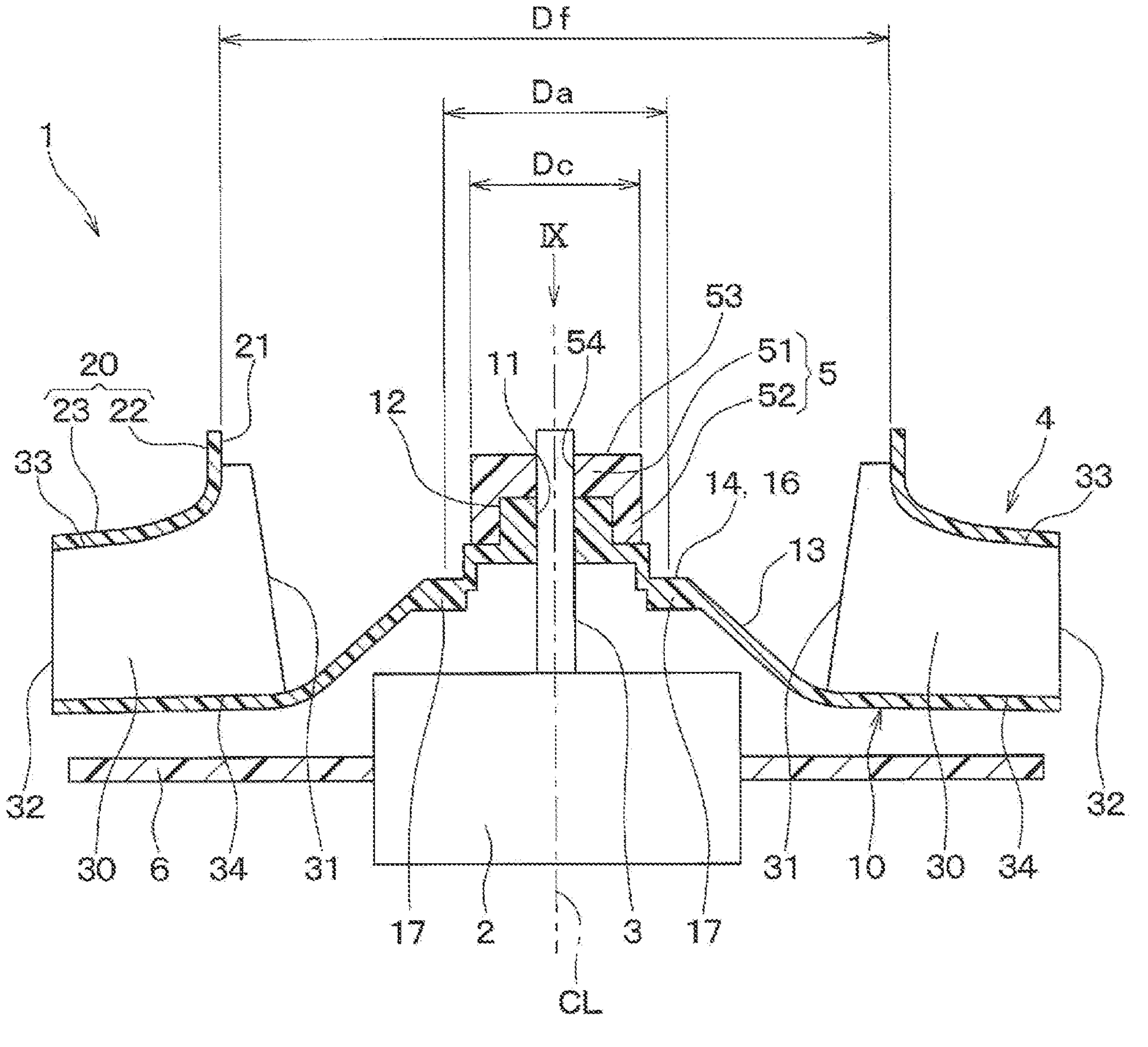
FIG. 8 is a cross-sectional view of a blower of a third embodiment taken along an imaginary plane which includes a central axis of the blower.
Figure 9:
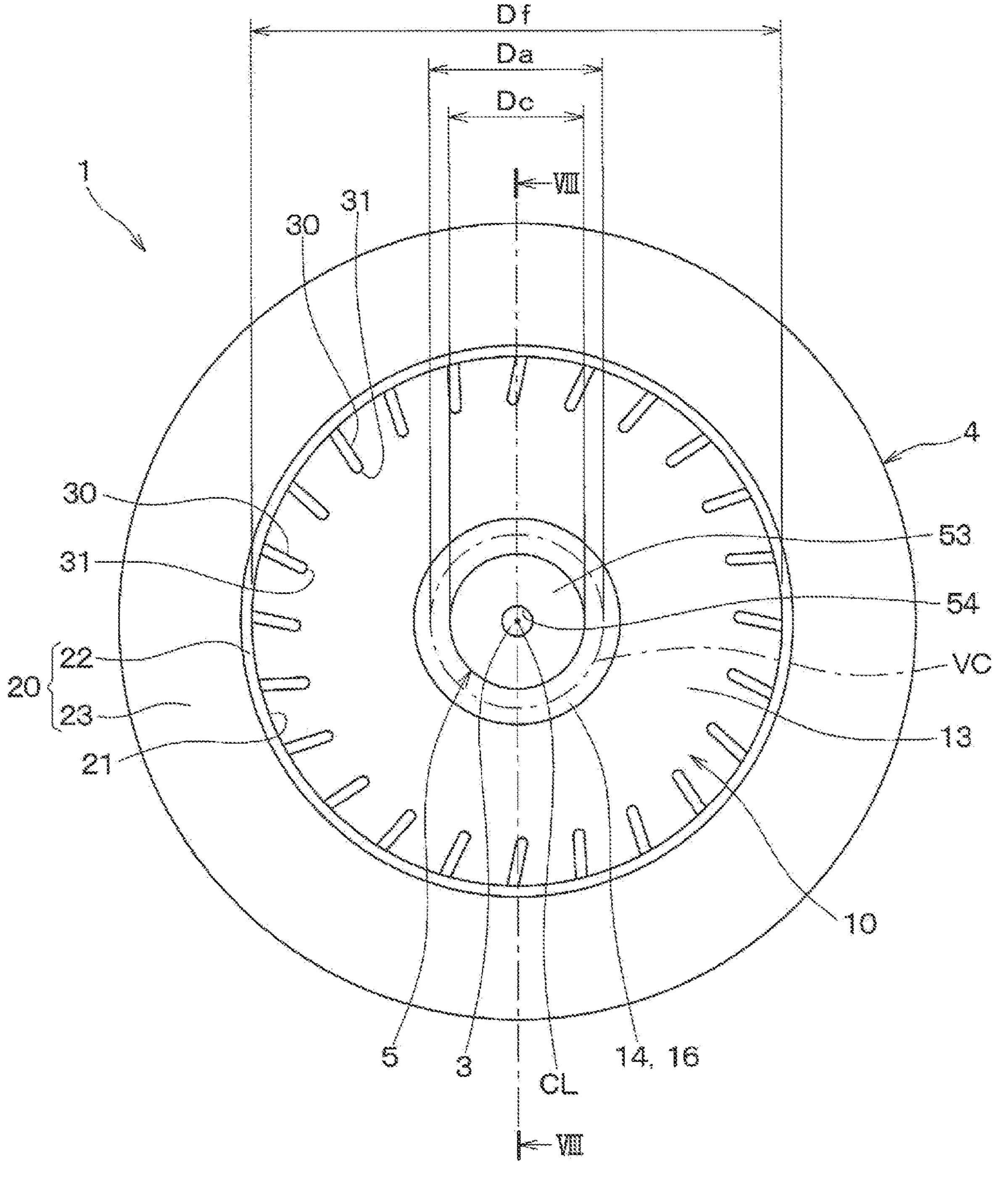
FIG. 9 is a plan view seen in a direction of an arrow IX in FIG. 8.

As shown in FIGS. 8 and 9, in the third embodiment, the projections 15 are not formed at the main plate 10 of the fan 4. Instead, the main plate 10 of the fan 4 has the step 14 at the part of the slope portion 13. The surface of the step 14 extends perpendicular to the central axis CL. Furthermore, the step 14 is shaped in the form of the ring which circumferentially extends around the central axis CL. In the third embodiment, the step 14, which is formed at the part of the slope portion 13 of the main plate 10 in the fan 4, forms the planar surface part 16 which is perpendicular to the central axis CL. Specifically, the planar surface part 16 of the third embodiment is formed continuously around the central axis CL at the part of the slope portion 13.

The ribs 17 are formed at the opposite side of the main plate 10, which is opposite to the step 14, such that each of the ribs 17 is placed at a location that is on an axial side of the step 14 which is opposite to the suction inlet 21. The ribs 17 are provided to increase the rigidity of the main plate 10 at and around the locations where the step 14 is formed. Specifically, during the assembling process, at the time of applying the load from the pressing jig to the step 14, the ribs 17 can limit the deformation of the step 14 and its surroundings toward the drive device 2 side.

Even in the third embodiment, the diameter Da of the imaginary circle VC, which circumferentially extends through the radial center of the planar surface part 16 formed as the step 14, and the outer diameter Dc of the rotation limiter member 5 satisfy the relationship $Dc<Da$. Therefore, in comparison to the case where the load is applied only to the rotation limiter member 5, it is possible to limit the tilting of the fan 4 at the time of press-fitting the fan 4 by also applying the load to the planar surface parts 16. Furthermore, the diameter Da of the imaginary circle VC, which circumferentially extends through the radial center of the planar surface part 16 formed as the step 14, and the diameter Df of the suction inlet 21 of the shroud 20 satisfy the relationship $Da<Df$. Thus, even when the load is applied to the planar surface part 16 at the time of press-fitting the fan 4, the flexing of the planar surface part 16 and its surroundings can be limited.

The blower 1 of the third embodiment described above can achieve the same actions and effects as those of the first and second embodiments. Specifically, in the blower 1, by forming the step 14, which is formed at the part of the slope portion 13 of the main plate 10, as the planar surface part 16, it is possible to limit the tilting of the fan 4 at the time of press-fitting the fan 4. Therefore, even with the configuration of the blower 1 of the third embodiment, it is possible to limit the imbalance of the center of gravity during the assembling process to reduce the vibration at the time of rotating the fan 4.

Other Embodiments (1) In the first and second embodiments, each of the planar surface parts 16 is formed as the surface of the corresponding one of the projections 15, which face toward the suction inlet 21 and is perpendicular to the central axis CL. However, the present disclosure is not limited to this. For example, the distal end portions of the projections 15 may be rounded, and the planar surface part 16 may be an imaginary planar surface that is formed by connecting apexes of the rounded distal end portions of the projections 15.

(2) In the first and second embodiments, each of the projections 15, which are formed at the main plate 10 of the blower 1, is shaped in the cylindrical columnar form. However, the present disclosure is not limited to this. For example, each of the projections 15 may be shaped in a polygonal columnar form, or the projection 15 may be in a form of a fan or a form of a circular ring which is centered on the central axis CL in the axial view.

(3) In each of the first and second embodiments, the projections 15 are arranged substantially equal intervals around the central axis CL at the part of the slope portion 13 of the main plate 10 of the blower 1. However, the present disclosure is not limited to this. For example, the projections 15 may be arranged at unequal intervals.

(4) In the first and third embodiments, the step 14 is shaped in the form of the ring at the part of the slope portion 13 of the main plate 10 of the blower 1. However, the present disclosure is not limited to this. For example, the step 14 may be formed intermittently in the circumferential direction about the central axis CL.

(5) In each of the above embodiments, there is described the assembling method that press-fits the fan 4 and the rotation limiter member 5 to the shaft 3 in the state where the fan 4 and the rotation limiter member 5 are temporarily assembled together. However, the present disclosure is not limited to this. For example, the fan 4 and the rotation limiter member 5 may be separately securely press-fitted to the shaft 3.

(6) In each of the above embodiments, the fan 4 and the rotation limiter member 5 are formed separately. However, the present disclosure is not limited to this. For example, the fan 4 and the rotation limiter member 5 may be formed integrally in one-piece.

(7) In each of the above embodiments, the drive device 2 includes the electric motor. However, the present disclosure is not limited to this. Any of various types of drive devices, which output torque, can be employed as the drive device 2.

The present disclosure is not limited to the above embodiments, and the above embodiments may be appropriately modified. Further, the above embodiments are not unrelated to each other and can be appropriately combined unless the combination is clearly impossible. Needless to say, in each of the above-described embodiments, the elements of the embodiment are not necessarily essential except when it is clearly indicated that they are essential and when they are clearly considered to be essential in principle. In each of the above embodiments, when a numerical value such as the number, numerical value, amount, range or the like of the constituent elements of the embodiment is mentioned, the present disclosure should not be limited to such a numerical value unless it is clearly stated that it is essential and/or it is required in principle. In each of the above embodiments, when the shape, the positional relationship or the like of the constituent elements of the embodiment are mentioned, the present disclosure should not be limited to the shape, the positional relationship or the like unless it is clearly stated that it is essential and/or it is required in principle.

What is claimed is:

1. A blower comprising:

an electric motor;

a shaft that is configured to be rotated by a torque outputted from the electric motor;

a fan that includes:

a main plate that has an axial hole which is securely press-fitted to the shaft;

a shroud that is opposed to the main plate and has a suction inlet, which is formed at a center part of the shroud and is configured to suction air; and a plurality of blades that are placed between the shroud and the main plate and are arranged one after another around a central axis of the fan; and a cap that is fixed to the shaft and the main plate and is configured to limit relative rotation between the shaft and the fan, wherein:

the main plate includes:

a slope portion that is placed on an outer side of the cap and is tilted such that a distance from the central axis to the slope portion in a radially outer direction is increased from one axial side, at which the axial hole is placed, toward the electric motor; and at least three projections that project from a part of the slope portion toward the suction inlet and are intermittently arranged one after another around the central axis, wherein in a plane perpendicular to the central axis, the at least three projections are entirely placed on a radially outer side of a virtual circle that is centered on the central axis and is in contact with a radially outermost part of the cap; and a surface of each of the at least three projections, which faces toward the suction inlet, forms a planar surface part that is located along a common imaginary plane which is perpendicular to the central axis, wherein the planar surface part of each of the at least three projections is configured to receive a load that is directed toward the electric motor in a direction parallel to the central axis to press-fit the axial hole of the main plate to the shaft.

2. The blower according to claim 1, wherein:

the main plate has a step that is formed at the part of the slope portion and extends perpendicular to the central axis; and each of the at least three projections projects from the step toward the suction inlet.

3. The blower according to claim 1, wherein the main plate has at least three ribs, and each of the at least three ribs is placed at a location that is on an axial side of a corresponding one of the at least three projections which is opposite to the suction inlet.

4. The blower according to claim 1, wherein the blower satisfies a relationship of Da>Dc where:

Da denotes a diameter of an imaginary circle, wherein the imaginary circle is centered on the central axis and circumferentially extends through a radial center of the planar surface part of each of the at least three projections; and Dc denotes an outer diameter of the cap.

5. The blower according to claim 1, wherein the blower satisfies a relationship Da<Df where:

Da denotes a diameter of an imaginary circle, wherein the imaginary circle is centered on the central axis and circumferentially extends through a radial center of the planar surface part of each of the at least three projections; and Df denotes a diameter of the suction inlet of the shroud.

6. The blower according to claim 1, wherein the blower satisfies a relationship of Dc<Da<Df where:

Da denotes a diameter of an imaginary circle, wherein the imaginary circle is centered on the central axis and circumferentially extends through a radial center of the planar surface part of each of the at least three projections;

Dc denotes an outer diameter of the cap; and

Df denotes a diameter of the suction inlet of the shroud.

* * * * *